United States Patent [19]
Nishiguchi

[11] Patent Number: 4,908,693
[45] Date of Patent: Mar. 13, 1990

[54] WIRING STRUCTURE OF SEMICONDUCTOR PRESSURE SENSOR

[75] Inventor: Masanori Nishiguchi, Kanagawa, Japan

[73] Assignee: Sumitomo Electric Industries, Ltd., Osaka, Japan

[21] Appl. No.: 130,323

[22] Filed: Dec. 8, 1987

[30] Foreign Application Priority Data

Dec. 8, 1986 [JP] Japan ................ 61-292082
Dec. 8, 1986 [JP] Japan ................ 61-292083
Dec. 8, 1986 [JP] Japan ................ 61-292084

[51] Int. Cl.⁴ .............. H01L 23/48; H01L 29/84; H01L 29/06; G01L 9/06
[52] U.S. Cl. ........................... 357/68; 357/26; 357/55; 73/777; 73/727
[58] Field of Search ............ 357/26, 55, 68; 73/727, 73/777

[56] References Cited

U.S. PATENT DOCUMENTS

| | | | |
|---|---|---|---|
| 3,994,009 | 11/1976 | Hartlaub ................. | 357/26 |
| 4,203,128 | 5/1980 | Guckel et al. ............ | 357/26 |
| 4,314,226 | 2/1982 | Oguro et al. ............. | 357/26 |
| 4,320,664 | 3/1982 | Rehn et al. .............. | 73/727 |
| 4,332,000 | 5/1982 | Petersen ................. | 357/26 |
| 4,410,871 | 10/1983 | Mallon et al. . | |
| 4,426,768 | 1/1984 | Black et al. . | |
| 4,588,472 | 5/1986 | Shimizu .................. | 73/777 |
| 4,654,621 | 3/1987 | Sugiyama . | |
| 4,672,354 | 6/1987 | Kurtz et al. ............. | 73/727 |

FOREIGN PATENT DOCUMENTS 0010204 4/1980 European Pat. Off. .
0150827 8/1985 European Pat. Off. .

OTHER PUBLICATIONS

Patent Abstracts of Japan, Semiconductor Composite Sensor, Sumitomo Denki Kogyo K.K., Jun. 10, 1986, vol. 10 No. 10 162 (P-466)(2218).
Patent Abstracts of Japan, Semiconductor Composite Sensor, Sumitomo Denki Kogyo K.K., Nov. 19, 1985, vol. 9 No. 292 (P-406)(2015).
Regelungstechnische Praxis, U. Theden et al, "Halbleiter-Druckaufnehmer Mit . . . ", vol. 24, No. 7, Jul. 1982 pp. 223-230.

*Primary Examiner*—Gene M. Munson
*Attorney, Agent, or Firm*—Cushman, Darby & Cushman

[57] ABSTRACT

A semiconductor pressure sensor comprises a sensor chip including an etching stop layer of high concentration impurity ions formed by ion implantation of impurity ions into a substrate of silicon single crystal or by deposition and diffusion and an epitaxial growth layer of silicon single crystal on the etching stop layer, a recess formed in the back of the sensor chip by etching, circuit elements formed on the sensor chip, diffusion leads for connecting the circuit elements, connecting regions, each formed between the etching stop layer and a predetermined position on the surface of the sensor chip, and diffusion regions, each formed between the predetermined position and one of terminals of the circuit elements.

6 Claims, 20 Drawing Sheets

WIRING STRUCTURE OF SEMICONDUCTOR PRESSURE SENSOR

BACKGROUND OF THE INVENTION

The present invention relates to the wiring structure of a semiconductor pressure sensor, more particularly, to the wiring structure of a semiconductor pressure sensor such as a medical semiconductor pressure sensor attached to the tip of a catheter in which the increase of wiring or the design of a circuit pattern is easily made.

A semiconductor pressure sensor has been developed with paying attention to the fact that when a mechanical stress is applied to a semiconductor crystal such as silicon, the resistivity of the crystal is largely changed due to the piezoresistance effect. A conventional semiconductor pressure sensor is made by forming strain gauge resistors on the surface layer of a silicon single crystal substrate by diffusion, constructing the Wheatstone bridge by wiring the four strain gauge resistors with diffused lead portions, and providing Al pads on the diffused lead portions, and further forming an etching stop layer in the substrate so that a thin diaphragm capable of being deformed by a pressure is formed by removing the back of the silicon single crystal by etching.

The above described semiconductor pressure sensor is very small. Especially, for medical use, since a plurality of semiconductor pressure sensors are attached to the tip of a catheter which is inserted into a body, the length of a side of a chip must be about 1 mm or less even if periphery circuits such as a temperature compensation circuit are included. Further, since the sensors are disposed at the tip of the catheter, the Al pads must be disposed at one side of the surface of the semiconductor pressure sensor, which are wired to the strain gauge resistors, sensors and the like by the diffused lead portions having a predetermined width.

The above-mentioned wiring structure with only diffused lead portions on the substrate has disadvantages that, since at least two wiring leads must be provided when an element such as a sensor or a transistor is added onto the substrate surface, other wiring leads are largely affected by the addition so that the flexibility of the design of wiring pattern, i.e., the design of circuit pattern is remarkably restricted.

Especially, the semiconductor pressure sensor for medical use is very small in chip size and the Al pads are disposed on one side of the chip so that the design of the circuit pattern is very difficult in case that two wiring leads must be provided for the addition of an element.

SUMMARY OF THE INVENTION

In view of the above described problems of the prior art, the object of the present invention is to provide the wiring structure of a semiconductor pressure sensor in which wiring for the addition of elements is easily made by using an etching stop layer as the wiring.

According to the wiring structure of the semiconductor pressure sensor of the present invention, a terminal of an element on a substrate can be connected to the etching stop layer by a connecting region formed between a predetermined position of the substrate and the etching stop layer, and a conductive diffusion region formed between the predetermined position of the substrate and the terminal, so that a part of the wiring can be substituted with the etching stop layer. Accordingly, the design of circuit pattern can be easily made for the addition of elements accompanied with the increase wiring leads.

DETAILED DESCRIPTION OF THE PREFERRED EMBODIMENTS

The present invention will now be described in detail with reference to the accompanied drawings.

Figure 1:
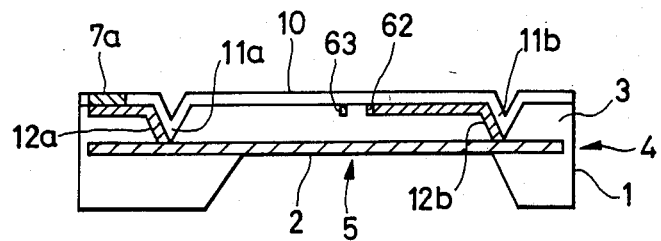
FIG. 1 is a longitudinal sectional view showing the wiring structure of a semiconductor pressure sensor according to an embodiment of the present invention, which is taken along the line A—A of FIG. 2.
Figure 2:
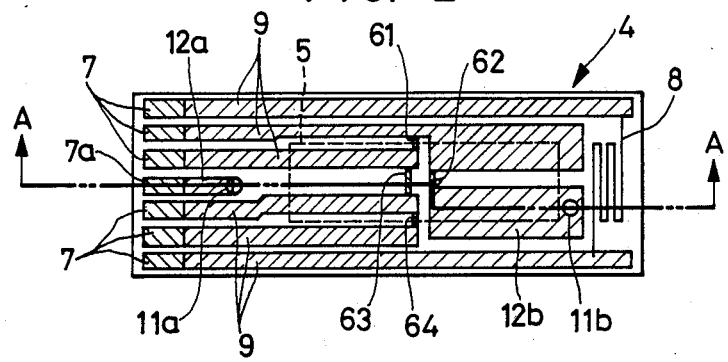
FIG. 2 is a cross sectional view showing the semiconductor pressure sensor.

FIG. 1 is a longitudinal sectional view showing the wiring structure of a semiconductor pressure sensor according to an embodiment of the present invention, and FIG. 2 is a cross sectional view of the semiconductor pressure sensor.

The typical thickness of the semiconductor pressure sensor is about 400 $\mu$m. A sensor chip 4 is composed of an etching stop layer 2 having boron ion concentration of $7.0 \times 10^{19}$ ions/cm$^3$ or more and the thickness of about 2 $\mu$m, which is formed by implanting boron ions of high concentration into a substrate 1 of an n$^-$type silicon single crystal or by deposition and diffusion, and an epitaxial growth layer 3 having the thickness of about 10–20 $\mu$m formed on the etching stop layer 2.

The back of the sensor chip 4 is removed by etching to form a diaphragm 5 having the thickness of 10–20$\mu$m. P$^-$type strain gauge resistors 61, 62, 63 and 64, the resistivity of which is changed due to the piezoresistance effect, are formed on the surface of the diaphragm 5 by diffusion. Al pads 7 are provided on one side of the sensor chip 4 and a temperature sensor 8 for compensating the affect to the strain gauge resistors by the ambient temperature is provided on the other side of the sensor chip against the Al pads 7. An insulating layer 10 made of SiO$_2$, SiN or SiO$_x$N$_y$ is formed on the surface of the sensor chip 4.

The wiring of the above sensor chip is conducted as follows. By the P$^+$type diffusion lead portions 9, the outermost Al pads 7 are connected to the temperature sensor 8, and the strain gauge resistors 61, 62, 63 and 64 are connected to each other in series. The diffusion lead portions 9 connected to the strain gauge resistors are connected to the Al pad 7 provided on one side of the sensor chip 4.

Next, the parts which are difficult to be wired, for example, the wiring between the Al pad 7a and the strain gauge resistor 62 is conducted through the etching stop layer 2.

According to an embodiment of the present invention, holes 11a and 11b, which are extended to at least the near portion of the etching stop layer 2, are formed by an anisotropic etching at positions convenient for the wiring, for example, at the neighboring portions of the A1 pad 7a and the strain gauge resistor 62. Then, a p+type diffusion region 12a is formed between the A1 pad 7a and the hole 11a, and in the surrounding surface of the hole 11a. Similarly, a p+type diffusion region 12b is formed between the strain gauge resistor 62 and the hole 11b, and in the surrounding surface of the hole 11b.

Accordingly, the wiring is conducted through the path of the A1 pad 7a→ the p+type diffusion region 12a→ the etching stop layer 2→the p+type diffusion region 12b→ the strain gauge resistor 62, so that the A1 pad 7 provided on one side of the sensor chip 4 is easily connected to the strain gauge resistor or the like through the etching stop layer 2.

Also, the connection between the A1 pad 7a and the strain gauge resistor 62 can be made by forming diffusion lead portions for each of the A1 pad 7a and the strain gauge resistor 62 and implanting conductive ions such as boron ions into the diffusion lead portions up to the etching stop layer 2.

Figure 3:
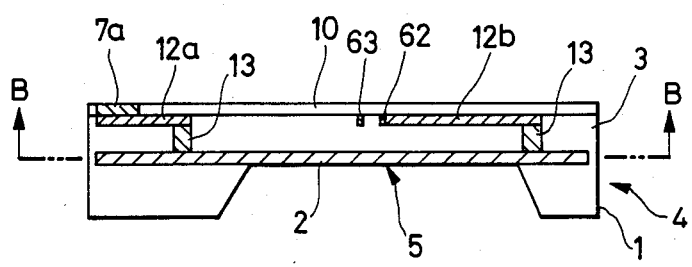
FIG. 3 is a longitudinal sectional view showing the wiring structure of a semiconductor pressure sensor according to another embodiment of the present invention, which is taken along the line A—A of FIG. 4.
Figure 4:
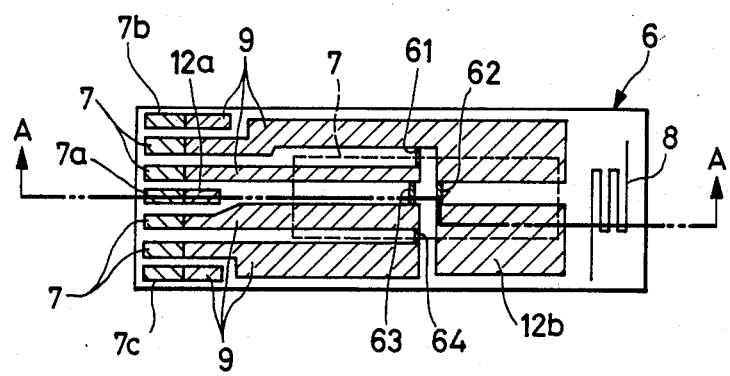
FIG. 4 is a cross sectional view showing the semiconductor pressure sensor.
Figure 5:
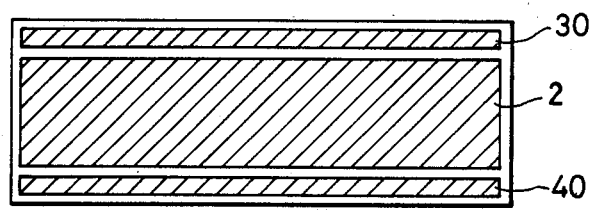
FIG. 5 is a cross sectional view showing the wiring pattern layer, which is taken along the line B—B of FIG. 3.

FIG. 3 is a longitudinal sectional view showing the wiring structure of a semiconductor pressure sensor according to another embodiment of the present invention. FIG. 4 is a cross sectional view showing the semiconductor pressure sensor, and FIG. 5 is a cross sectional view shown wiring pattern layers. The semiconductor pressure sensor in this embodiment is similar to that shown in FIG. 1 and the same reference numerals are used for the same parts or the like parts in the all drawings. The thickness of the semiconductor sensor in this embodiment is also about 400 μm. A sensor chip 4 is made by forming an etching stop layer 2 having the boron ion concentration of $7.0 \times 10^{19}$ ions/cm$^3$ or more and the thickness of about 2 μm and wiring layers 30 and 40 in parallel to the etching stop layer 2 (see the wiring pattern layer shown in FIG. 5) through implantation of high concentration boron ions into a substrate 1 of an n−type silicon single crystal or through deposition and diffusion, and by forming an epitaxial growth layer 3 having the thickness of about 10–20 μm on the etching stop layer 2 and the wiring layers 30 and 40.

Further, a diaphragm 5 having the thickness of about 10–20 μm is formed by removing the back of the sensor chip 4 through etching, and p−type strain gauge resistors 61, 62, 63 and 64, the resistivity of which is changed due to the piezoresistance effect, are formed by diffusion on the surface of the diaphragm 5. A1 pads 7 are provided on one side of the sensor chip 4, and a temperature sensor 8 for compensating the affect to the strain gauge resistors by the ambient temperature is provided on the other side of the sensor chip 4. An insulating layer 10 made of SiO$_2$, SiN or SiO$_x$N$_y$ is formed on the surface of the sensor chip 4.

The etching stop layer 2 not only determines the thickness of the diaphragm 5 but also is used for the wiring.

The strain gauge resistors 61, 62 63 and 64 are connected to each other in series by p+type diffusion lead portions 9 on the surface of the sensor chip 4. The diffusion lead portions 9 are connected to the A1 pads 7 provided on one side of the sensor chip. A Wheatstone bridge is constructed by the combination of the A1 pads, to which a voltage is applied from the outside and from which an output is taken out.

Next, the wiring of the portions of the sensor chip 4 where the wiring is difficult, for example, the wiring between the A1 pad 7a formed on the diffusion lead portion 12a and the diffusion lead portion 12b connected to the strain gauge resistor 62 is easily conducted by implanting boron ions into the diffusion lead portions 12a and 12b to form p++type wiring regions 13 between each of the diffusion lead portions 12a and 12b and the etching stop layer 2 provided beneath the diffusion lead portions, so that the etching stop layer 2 is used as the back wiring.

Further, the wiring between the temperature sensor 8 added onto the semiconductor pressure sensor and the A1 pads 7b and 7c can be conducted through the wiring layers 30 and 40 by implanting boron ions, similarly to the wiring of the diffusion lead portions 12a and 12b and the etching stop layer 2.

In brief, the number of wiring leads can be increased without enlarging the area by connecting the etching stop layer and the wiring layers to the diffusion lead portions. Accordingly, the addition of the temperature sensor and the like is easily made and the design of the circuit pattern can be facilitated.

The present invention is not limited to the above described embodiments. For example, when an element for pressure sensitivity is added in addition to the temperature sensor, the number of the wiring leads may be increased by dividing the wiring layers 30 and 40. Also, the ion implantation to the etching stop layer 2 may be carried out at only one portion and the wiring leads are taken out from the back of the etching stop layer through bonding. Further, various modifications are possible within the scope and the spirit of the present invention.

As described above, according to the wiring structure of the present invention, a terminal of an element can be connected to the etching stop layer by a connecting region formed between a predetermined position of the substrate and the etching stop layer, and a conductive diffusion region formed between the predetermined position of the substrate and the terminal, so that a part of the wiring can be substituted with the etching stop layer. Accordingly, the design of the circuit pattern can be facilitated for the addition of elements accompanied with the increase of the wiring leads.

What is claimed is:

1. A semiconductor pressure sensor, comprising:
   a sensor chip including an etching stop layer of high concentration impurity ions formed by ion implantation of impurity ions into a substrate of silicon single crystal or by deposition and diffusion, and an epitaxial growth layer of silicon single crystal on said etching stop layer;
   a recess formed in the back of said sensor chip through etching;
   circuit elements formed on said sensor chip;
   diffusion lead portions for wiring said circuit elements;
   first connecting regions, each formed between said etching stop layer and a first predetermined position on the surface of said sensor chip; and
   first diffusion regions, each formed between said first predetermined position and one of terminals of said circuit elements.

2. A semiconductor pressure sensor as claimed in claim 1, wherein said first connecting regions are formed by impurity ion implantation.

3. A semiconductor pressure sensor as claimed in claim 1, wherein said first connecting regions are formed by providing holes extended to at least the adjoining portion of said etching stop layer at said first predetermined positions and by forming conductive diffusion regions in the surroundings of said holes.

4. A semiconductive pressure sensor as claimed in claim 1, further comprising wiring layers formed in parallel to said etching stop layer; second connecting regions, each formed between one of said wiring regions and a second predetermined position on the surface of said sensor chip; and second diffusion regions, each formed between said second predetermined position and one of terminals of said circuit elements.

5. A semiconductor pressure sensor as claimed in claim 4, wherein said second connecting regions are formed by impurity ion implantation.

6. A semiconductor pressure sensor as claimed in claim 4, wherein said second connecting regions are formed by providing holes extended to at least the adjoining portion of said wiring region at said second predetermined position and by forming conductive diffusion regions in the surroundings of said holes.

* * * * *